US010170945B2

(12) United States Patent
Yoo

(10) Patent No.: US 10,170,945 B2
(45) Date of Patent: Jan. 1, 2019

(54) YAGI ANTENNA SHAPED WIRELESS POWER TRANSMISSION APPARATUS

(71) Applicant: UNIVERSITY OF ULSAN FOUNDATION FOR INDUSTRY COOPERATION, Ulsan (KR)

(72) Inventor: Hyoung Suk Yoo, Ulsan (KR)

(73) Assignee: University of Ulsan Foundation for Industry Cooperation, Ulsan (KR)

( * ) Notice: Subject to any disclaimer, the term of this patent is extended or adjusted under 35 U.S.C. 154(b) by 140 days.

(21) Appl. No.: 15/501,371

(22) PCT Filed: Jul. 30, 2015

(86) PCT No.: PCT/KR2015/008011
§ 371 (c)(1),
(2) Date: Feb. 2, 2017

(87) PCT Pub. No.: WO2016/021877
PCT Pub. Date: Feb. 11, 2016

(65) Prior Publication Data
US 2017/0237299 A1    Aug. 17, 2017

(30) Foreign Application Priority Data

Aug. 6, 2014 (KR) .................. 10-2014-0101208

(51) Int. Cl.
*H02J 50/23* (2016.01)
*H01Q 19/04* (2006.01)
(Continued)

(52) U.S. Cl.
CPC ............ *H02J 50/23* (2016.02); *H01Q 19/04* (2013.01); *H01Q 19/30* (2013.01); *H04B 5/00* (2013.01);
(Continued)

(58) Field of Classification Search
CPC .......... H02J 50/23; H02J 7/025; H01Q 19/04; H01Q 19/30; H04B 5/00; H04B 5/0037; H04B 5/0081
See application file for complete search history.

(56) References Cited

FOREIGN PATENT DOCUMENTS

| KR | 10-2002-0028801 A | 4/2002 |
|---|---|---|
| KR | 10-2014-0065161 A | 5/2014 |

OTHER PUBLICATIONS

International Search Report issued in connection with PCT/KR2015/008011.
(Continued)

*Primary Examiner* — Robert DeBeradinis
(74) *Attorney, Agent, or Firm* — Akerman LLP

(57) ABSTRACT

The present invention relates to a Yagi antenna and a wireless power transmission apparatus comprising the same, and the Yagi antenna includes a wireless power transmitting coil and first and second slabs made of a metamaterial having a CHDR structure in which cube-shaped resonators are arranged at a predetermined interval. The first slab is positioned at a rear side of the power transmitting coil and serves as a reflector that reflects an electromagnetic wave generated at the power transmitting coil, and the second slab is positioned between the power transmitting coil and a power receiving coil and serves as a super lens that focuses the electromagnetic wave generated at the power transmitting coil. The wireless power transmission apparatus improves efficiency of wireless power transmitted to the power receiving coil by using the Yagi antenna.

12 Claims, 4 Drawing Sheets

(51) Int. Cl.
*H01Q 19/30* (2006.01)
*H04B 5/00* (2006.01)
*H02J 7/02* (2016.01)

(52) U.S. Cl.
CPC ......... *H04B 5/0037* (2013.01); *H04B 5/0081* (2013.01); *H02J 7/025* (2013.01)

(56) References Cited

OTHER PUBLICATIONS

Baker, Julian, "Optimizing Antenna Gain With a Metamaterial Filter", Thesis, 2011, see pp. 41, 42 and figures 2-17.

[FIG. 1]
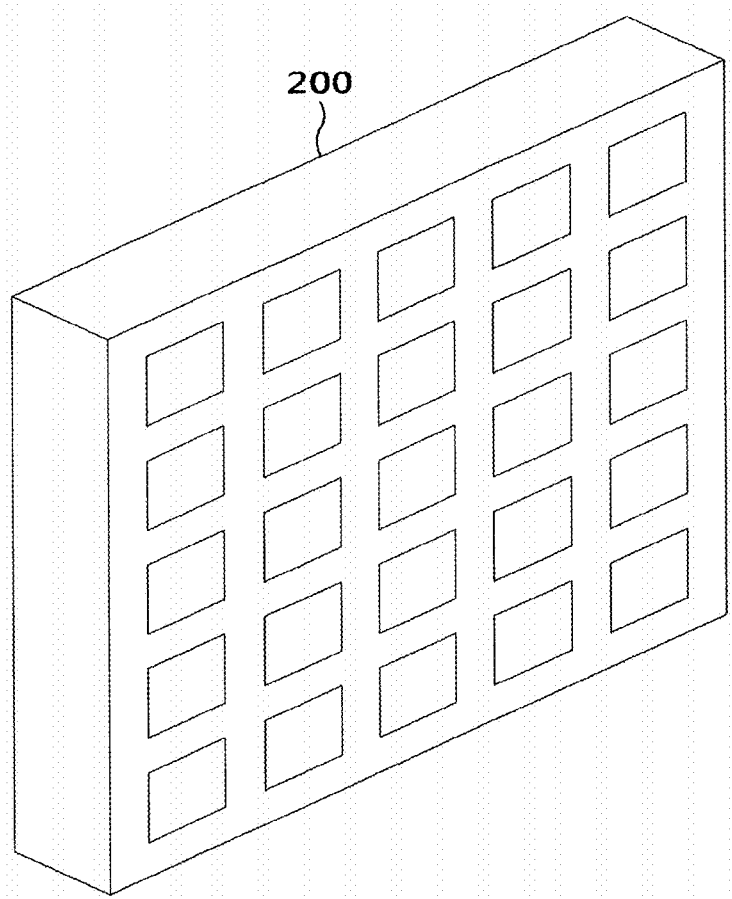
[FIG. 2a]
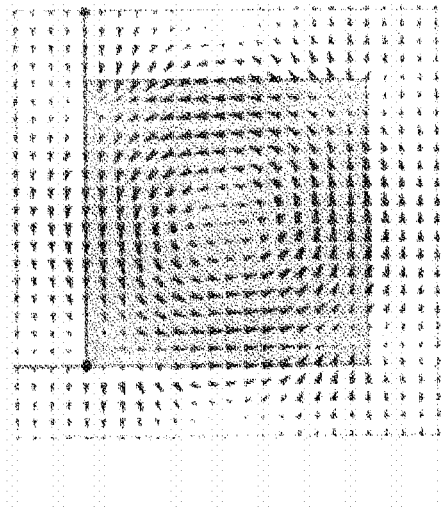

[FIG. 2b]
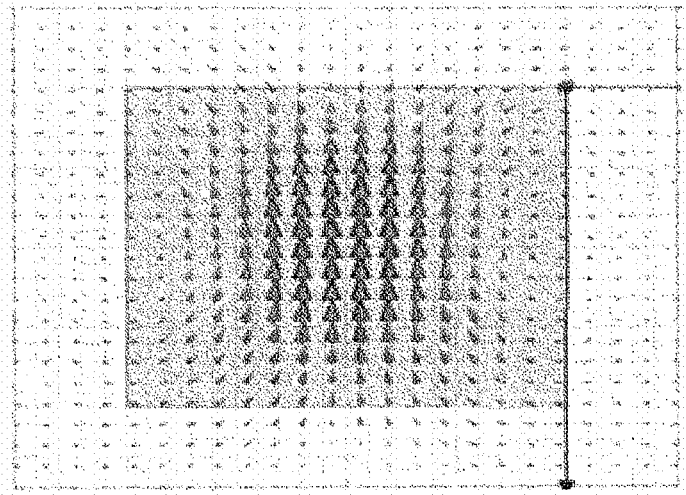
[FIG. 3]
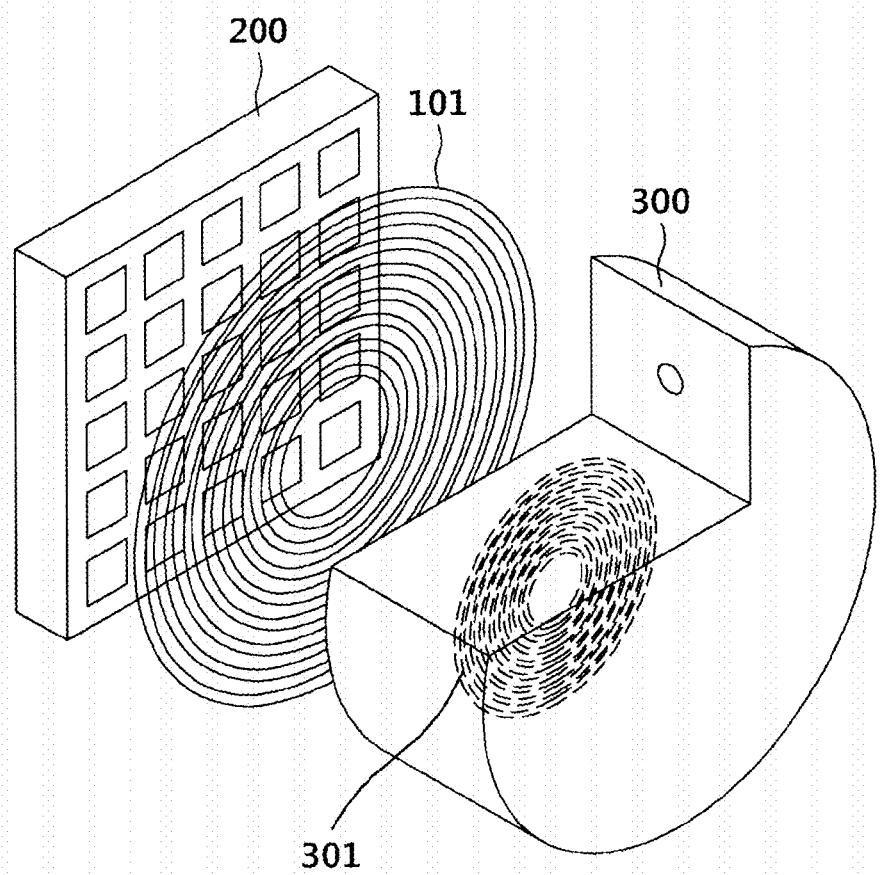

[FIG. 4]
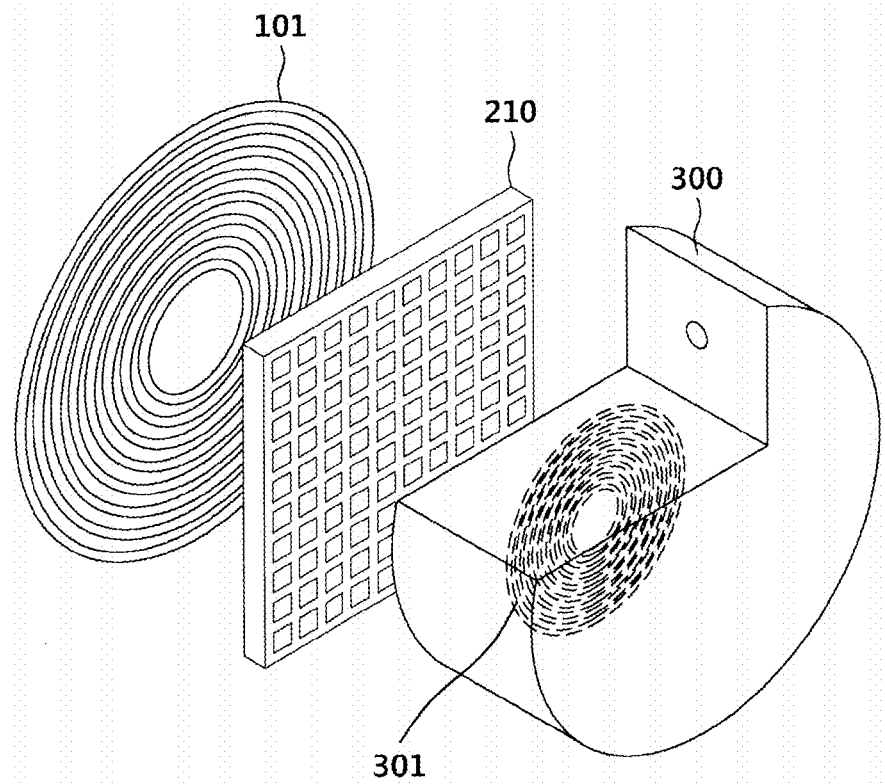
[FIG. 5]
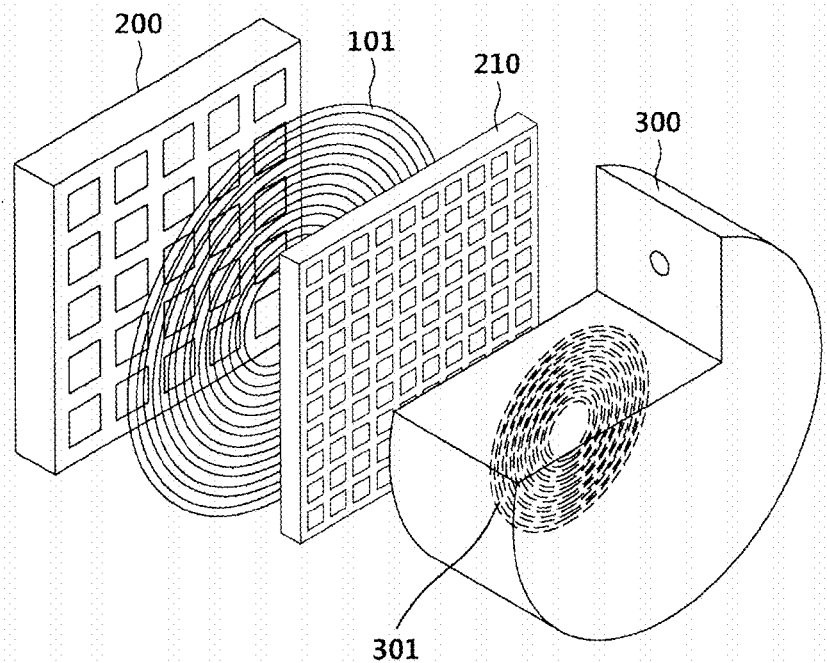

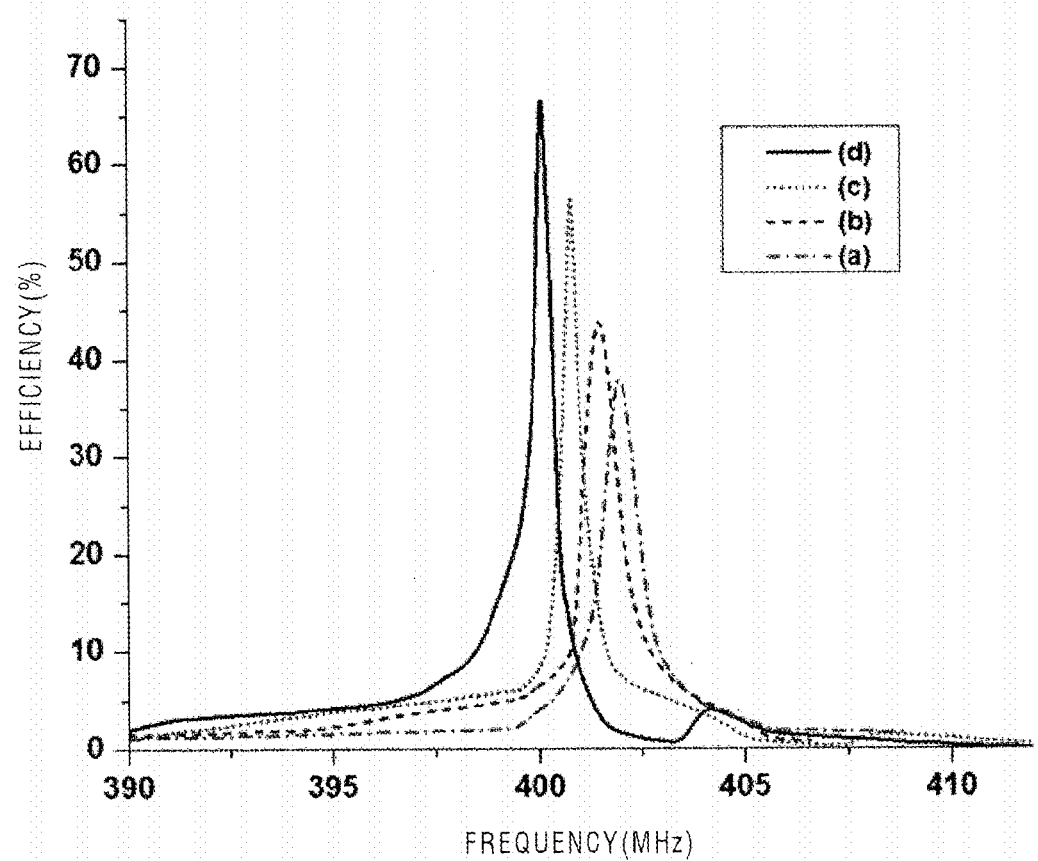

YAGI ANTENNA SHAPED WIRELESS POWER TRANSMISSION APPARATUS

This application is a national phase of PCT/KR2015/008011, filed Jul. 30, 2015, and claims priority to KR 10-2014-0101208, filed Aug. 6, 2014, the entire contents of both of which are hereby incorporated by reference.

TECHNICAL FIELD

The present invention relates to an apparatus for transmitting power in a wireless manner. More specifically, the present invention relates to a Yagi antenna (Yagi-Uda antenna) which uses slabs made of a metamaterial and has power transmission efficiency improved by applying a wireless power transmission technology, and a wireless power transmission apparatus including the same.

BACKGROUND ART

In the related art, most of portable electronic devices are supplied with power for operation from a battery. However, a volume and a weight of the portable electronic device are increased because a battery is mounted in the portable electronic device, and a user is inconvenienced because the battery is recharged due to a restricted power supply of the battery.

A technology for solving the problems is a wireless power transmission method. The wireless power transmission method includes a power transmitting device which supplies electrical energy, and a power receiving device which receives the supplied electrical energy and charges the battery.

One of the most widely used wireless power transmission technology is an inductive coupling method. The inductive coupling method enables the user to easily charge an electronic device such as a portable device because electrical signals generated at transmitting and receiving sides are transmitted in a wireless manner through a coil. Recently, a wireless power transmission technology, which has a high efficiency and exceeds an appropriate radio wave range by using a pair of inductively coupled resonant coils having a high Q factor, has been developed.

A resonant coupling method refers to a method that uses a receiving coil configured as an LC resonator, and a transmitting coil. In this case, both of the receiving coil and the transmitting coil are adjusted to have the same or similar resonant frequency. With the resonance phenomenon, the wireless power transmission technology may transmit power even though the transmitting coil and the receiving coil have a small coupling coefficient or the transmitting coil and the receiving coil are positioned far away from each other.

However, there are problems in that transmission efficiency of the wireless power transmission method is not high in comparison with other power supply methods, and the transmission efficiency depends on various environmental factors. Therefore, there is a need for improved power transmitting and receiving devices for improving power transmission efficiency of a wireless power transmission apparatus.

DISCLOSURE

Technical Problem

Accordingly, a technical problem of the present invention is to provide a Yagi antenna for a wireless power transmission apparatus in which a slab made of a metamaterial is applied to a reflector or a super lens.

Another technical problem of the present invention is to improve efficiency of wireless power, which is transmitted to a receiving coil, by reflecting or focusing an electromagnetic wave transmitted from a transmitting coil by using the Yagi antenna.

Technical Solution

A Yagi antenna of the present invention includes a power transmitting coil which generates an electromagnetic wave, a first slab which is made of a metamaterial having a cubic high dielectric resonator (hereinafter, referred to as CHDR) structure, is positioned at a rear side of the power transmitting coil, and reflects the electromagnetic wave generated at the power transmitting coil, and a second slab which is made of a metamaterial having a CHDR structure, is positioned at a front side of the power transmitting coil, and focuses the electromagnetic wave generated at the power transmitting coil and the electromagnetic wave reflected by the first slab.

The CHDR structure of the first slab is configured such that cubes, which each have a width of 4 mm, a height of 4 mm, and a depth 4 mm, are arranged at an interval of 2 mm in the square slab having a width of 30 mm, a height of 30 mm, and a thickness of 6 mm.

The CHDR structure of the second slab is configured such that cubes, which each have a width of 2 mm, a height of 2 mm, and a depth 2 mm, are arranged at an interval of 1 mm in the square slab having a width of 30 mm, a height of 30 mm, and a thickness of 3 mm.

A wireless power transmission apparatus of the present invention includes a wireless power transmitting device which includes a power transmitting coil, a slab which is made of a metamaterial having a CHDR structure and reflects or focuses an electromagnetic wave generated at the power transmitting coil, and a wireless power receiving device which includes a power receiving coil that receives the electromagnetic wave.

The slab is positioned at a rear side of the power transmitting coil and reflects an electromagnetic wave generated at the power transmitting coil.

The CHDR structure is configured such that cubes, which each have a width of 4 mm, a height of 4 mm, and a depth 4 mm, are arranged at an interval of 2 mm in the square slab having a width of 30 mm, a height of 30 mm, and a thickness of 6 mm.

The slab is positioned between the power transmitting coil and the power receiving coil and focuses an electromagnetic wave generated at the power transmitting coil.

The CHDR structure is configured such that cubes, which each have a width of 2 mm, a height of 2 mm, and a depth 2 mm, are arranged at an interval of 1 mm in the square slab having a width of 30 mm, a height of 30 mm, and a thickness of 3 mm.

Advantageous Effects

According to the Yagi antenna according to the present invention, which is configured as described above, and the wireless power transmission apparatus including the same, it is possible to improve transmission efficiency of wireless power transmitted to the receiving coil by reflecting or focusing the electromagnetic wave transmitted from the transmitting coil by using the metamaterial slab applied to the Yagi antenna.

DESCRIPTION OF DRAWINGS

FIG. 1 is a structural view of a slab made of a metamaterial which is applied to exemplary embodiments of the present invention.

FIG. 2A is a view illustrating an electric field formed at the slab made of a metamaterial according to the present invention.

FIG. 2B is a view illustrating a magnetic field formed at the slab made of a metamaterial according to the present invention.

FIG. 3 is an arrangement view of a wireless power transmission apparatus according to a first exemplary embodiment of the present invention.

FIG. 4 is an arrangement view of a wireless power transmission apparatus according to a second exemplary embodiment of the present invention.

FIG. 5 is an arrangement view of a wireless power transmission apparatus according to a third exemplary embodiment of the present invention.

FIG. 6 is a graph associated with wireless power transmission efficiency according to the exemplary embodiment of the present invention.

BEST MODE

Since the present invention may be modified in various forms and include various exemplary embodiments, specific exemplary embodiments will be illustrated in the drawings and described in detail in the Detailed Description. In the description of the present invention, the specific descriptions of publicly known related technologies will be omitted when it is determined that the specific descriptions may obscure the subject matter of the present invention.

Hereinafter, exemplary embodiments of the present invention will be described in detail with reference to the accompanying drawings.

FIG. 1 is a structural view of a slab made of a metamaterial which is applied to exemplary embodiments of the present invention.

First, in the present invention, each of slabs 200 and 210 made of a metamaterial is positioned at a rear side of a power transmitting coil 101 of a wireless power transmitting device 100 and utilized as a reflector that reflects an electromagnetic wave generated at the power transmitting coil 101, or is positioned between the power transmitting coil 101 of the wireless power transmitting device 100 and a power receiving coil 301 of a wireless power receiving device 300 and utilized as a super lens that focuses an electromagnetic wave generated at the power transmitting coil 101.

In the related art, a metamaterial structure is configured by a metallic layer. Therefore, most of the metamaterial structures exhibit isotropic electromagnetic responses and conductive losses. In view of the purpose, the metamaterial needs to have an isotropic metamaterial structure that has a small size and a less loss, and may be easily manufactured. In the present invention, the metamaterial structure is a CHDR structure in which cube-shaped resonators having very high permittivity are arranged in a lattice shape on a substrate having low permittivity. The CHDR structure maintains characteristics of the metamaterial in a particular frequency band. In addition, the CHDR structure may adjust a particular frequency band exhibiting the characteristics by adjusting a size of the cube and thus changing a lattice constant or a dielectric constant.

FIGS. 2A and 2B are views illustrating an electric field and a magnetic field formed on the slab made of the metamaterial according to the present invention.

It can be seen that at the metamaterial slab 200 having the CHDR structure, intense displacement current is created in the cube due to a resonance phenomenon, and a magnetic dipole is induced by the displacement current.

Therefore, it is possible to expect negative refractive index characteristics at the slab 200 having the CHDR structure by a combination of the magnetic dipole and the cubes arranged in a lattice pattern.

FIG. 3 is an arrangement view of a wireless power transmission apparatus according to a first exemplary embodiment of the present invention.

In the first exemplary embodiment, the metamaterial slab 200 having the CHDR structure is utilized as a reflector. The metamaterial slab 200, which is utilized as a reflector, is referred to as a first slab. The first slab 200 is positioned at the rear side of the power transmitting coil 101 of the wireless power transmitting device 100, and reflects an electromagnetic wave generated at the power transmitting coil 101. The reflected electromagnetic wave and an electromagnetic wave generated at the power transmitting coil 101 are transmitted to the power receiving coil 301 of the wireless power receiving device 300, and as a result, wireless power transmission efficiency is improved.

In FIG. 3, the first slab 200 used as a reflector is configured such that cubes, which each have a width of 4 mm, a height of 4 mm, and a depth 4 mm, are arranged at an interval of 2 mm on a substrate having a width of 30 mm, a height of 30 mm, and a thickness of 6 mm.

A dielectric constant $\varepsilon_r$ of the cube is 20,000, and a dielectric constant $\varepsilon_r$ of the substrate is 4.

FIG. 4 is an arrangement view of a wireless power transmission apparatus according to a second exemplary embodiment of the present invention.

In the second exemplary embodiment, the metamaterial slab 210 having the CHDR structure is utilized as a super lens. The metamaterial slab 210, which is utilized as a super lens, is referred to as a second slab. The second slab 210 is positioned between the power transmitting coil 101 of the wireless power transmitting device 100 and the power receiving coil 301 of the wireless power receiving device 300, focuses the electromagnetic wave generated at the power transmitting coil 10, and transmits the electromagnetic wave to the power receiving coil 301 of the wireless power receiving device 300.

In the second exemplary embodiment of the present invention, the second slab 210 utilized as a super lens is configured such that cubes, which each have a width of 2 mm, a height of 2 mm, and a depth 2 mm, are arranged at an interval of 1 mm on a substrate having a width of 30 mm, a height of 30 mm, and a thickness of 3 mm.

Here, a dielectric constant $\varepsilon_r$ of the cube is 85,000, and a dielectric constant $\varepsilon_r$ of the substrate is 4.

FIG. 5 is an arrangement view of a wireless power transmission apparatus according to a third exemplary embodiment of the present invention.

The metamaterial slabs 200 and 210 in the third exemplary embodiment are configured by a combination of the arrangement of the reflector and the arrangement of the super lens. Because the structures of the first slab 200 and the second slab 210 have the same structure as described in the first exemplary embodiment and the second exemplary embodiment, a detailed description thereof will be omitted.

The arrangement as described in the third exemplary embodiment is a method which uses a principle of a Yagi antenna (Yagi-Uda Antenna), that is, a method which improves efficiency of wireless power transmitted to the power receiving coil 301 by utilizing the first slab 200 and the second slab 210 having the CHDR structure as a reflector and a super lens, respectively.

FIG. 6 is a graph associated with wireless power transmission efficiency according to the exemplary embodiment of the present invention.

Prior to the description of FIG. 6, a simulation of the present invention will be described. The simulation was modeled by assuming a pacemaker PM equipped with the wireless power transmission apparatus of the present invention and by using an XFdtd program of Remcom. As a frequency band, two types of standard frequency bands, that is, an ISM band (433 MHz to 915 MHz) and an MICS band (402 MHz to 403 MHz) were considered.

First, the power transmitting coil 101 and the power receiving coil 301 of the present invention each have a flat spiral shape, and are adjusted to be resonant coupled to each other at a particular frequency. The pacemaker of the simulation has a diameter of 3 cm and a height of 1 cm. An exterior of the pacemaker is made of titanium, and positioned under fat tissue (dielectric constants $\varepsilon_r=2.5$, conductivity $\sigma=0.035$ S/m). The fat tissue is biologically distant from a human's skin surface by 0.5 cm. Therefore, in the simulation, a distance between the power transmitting coil 101 and the power receiving coil 301 of the pacemaker is at least 0.5 cm or longer.

A size and a position of the power receiving coil 301 of the pacemaker have a great effect on wireless power transmission efficiency. In the pacemaker having a diameter of 3 cm, a maximum permissible diameter of the power receiving coil 301 is 2 cm.

TABLE 1

| Frequency (MHz) | Distance (cm) | Receiver Position | Efficiency (%) |
|---|---|---|---|
| MICS Band (~400 MHz) | 0.5 | On the surface of the PM can | 20 |
| | | Inside the PM can | 14 |
| | 1 | On the surface of the PM can | 13 |
| | | Inside the PM can | 6.8 |

Table 1 is a table showing power transmission efficiency with respect to distances between the power transmitting coil 101 and the power receiving coil 301 and positions of the power receiving coil 301. As shown in Table 1, it can be seen that transmission efficiency of wireless power transmitted to the power receiving coil 301 is higher in a case in which the power receiving coil 301 is positioned outside the pacemaker than a case in which the power receiving coil 301 is positioned inside the pacemaker by titanium that surrounds the exterior of the pacemaker.

In addition, Table 1 shows that the wireless power transmission efficiency is rapidly decreased as a distance between the power transmitting coil 101 and the power receiving coil 301 is increased.

Therefore, in the pacemaker, an appropriate distance between the power transmitting coil 101 and the power receiving coil 301 is 0.5 cm, and the power transmitting coil 101 needs to be positioned on a surface of the skin.

A size of the power transmitting coil 101 plays a crucial role for obtaining maximum available efficiency in the wireless power transmission apparatus of which the size needs to be kept small if possible. If a size of the power transmitting coil 101 is too small, intensity of the magnetic field is rapidly decreased due to a movement of an axis, and if a diameter of the power transmitting coil 101 is too large, a size of the wireless power transmission apparatus is not small any further.

In consideration of the situation, a maximum diameter of the power transmitting coil 101 of the present invention was limited to 4 cm.

The most important element for determining efficiency of the wireless power transmission apparatus is the Q factor of the resonators and coupling strength between the resonators. Strength coupling between the two resonators increases an energy exchange rate between the resonators, and as a result, power transmission efficiency is improved. Although the wireless power transmission apparatus using the resonator having a high Q factor exhibits high power transmission efficiency, preference is decreased because in an actual technical field, the coil tends to be sensitive to a peripheral environment and it is difficult to perform dynamic control.

Therefore, a method capable of improving maximum power transmission efficiency by increasing a coupling coefficient is considered.

The coupling coefficient is expressed by the following Expression 1.

$$K = \frac{M_{12}}{\sqrt{L_1 L_2}} \quad \text{(Expression 1)}$$

Here, K is a coupling coefficient, $L_1$ is an inductance value of the transmitting coil, $L_2$ is an inductance value of the receiving coil, and $M_{12}$ is a mutual inductance value between $L_1$ and $L_2$.

It can be seen from Expression 1 that in an ideal circular coil, the coupling coefficient is not greatly affected by an increase in number of turns, and a value of the numerator and a value of the denominator are increased at nearly the same rate. However, it can be seen from the result that a maximum value of the coupling coefficient is obtained at a particular number of turns when a ratio ($R=R_{int}/R_{ext}$) between an inner radius and an outer radius of the coil is nearly close to 0.4.

TABLE 2

| | Efficiency (%) | |
|---|---|---|
| $R = \frac{R_{int}}{R_{ext}}$ | ~403 MHz | ~900 MHz |
| 0.1 | 20.5 | 15.4 |
| 0.2 | 22.6 | 17.1 |
| 0.3 | 15.3 | 14.1 |
| 0.4 | 12.9 | 22.3 |
| 0.5 | 35.4 | 16.1 |
| 0.6 | 31.5 | 15 |
| 0.7 | 11.5 | 12.9 |
| 0.8 | 9.6 | 10.3 |

Table 2 shows wireless power transmission efficiency for each frequency band with respect to various R values based on the result. It was found that in the MICS band, transmission efficiency is highest, that is, 35.4% when R=0.5, and in the ISM band, and transmission efficiency is highest, that is, 22.3% when R=0.4. As a result of precisely testing the distribution of the electric fields of the two coils, it was confirmed that several dead zones are formed at the power receiving coil 301 in the ISM band. The reason is that a high frequency is more sensitive to a parasitic effect, a tissue absorption rate is high, and a loss is large.

Therefore, the MICS band exhibits more excellent efficiency than the ISM band.

A typical pacemaker requires power of 8 W. In the present invention, power of 0.23 mW was generated at the power receiving coil 301 having a diameter of 2 cm and a receiver connected to resistance of 50 by supplying voltage of 1 V. Therefore, the received power may satisfy power required for most of the pacemakers. Table 3 is a table showing simulation environment values having optimum efficiency of the present invention.

TABLE 3

| Band | Diameter (cm) $T_x$ | $R_x$ | Position $T_x$ | $R_x$ | Maximum efficiency |
|---|---|---|---|---|---|
| MICS | 4 | 2 | On Skin | On PM Can | ~35.4% |

In FIG. 6, (a) represents efficiency of the wireless power transmission apparatus to which no slab 200 or 210 was applied, (b) represents efficiency of the wireless power transmission apparatus when the first slab 200 was utilized, (c) represents efficiency of the wireless power transmission apparatus when the second slab 210 was utilized, and (d) represents efficiency of the wireless power transmission apparatus when both of the first slab 200 and the second slab 210 were utilized.

When no slab 200 or 210 was applied (a), a maximum value of the wireless power transmission efficiency was about 35%. In contrast, when the first slab 200 was utilized, a maximum value of the wireless power transmission efficiency was about 43%, and as a result, the maximum value was improved by about 23% in comparison with the case (a).

In the case (c), a maximum value of the wireless power transmission efficiency was about 57%, and in the case (d), a maximum value of the wireless power transmission efficiency was about 68%, and as a result, it was found that the efficiency was improved nearly two times in comparison with the case (a).

In addition, it can be seen that when the slabs 200 and 210 are applied, a maximum value of the wireless power transmission efficiency gradually becomes close to a region of 400 MHz.

The exemplary embodiments of the present invention disclosed in the present specification and the configurations illustrated in the drawings are the best preferred exemplary embodiments of the present invention and do not include all the technical spirit of the present invention. Accordingly, it should be appreciated that various equivalents and modified examples capable of substituting the exemplary embodiments may be made at the time of filing the present application. Therefore, the present invention is not limited to the above exemplary embodiments, the exemplary embodiments may be variously modified by those skilled in the art to which the present invention pertains without departing from the subject matters of the present invention claimed in the claims, and the modifications belong to the scope disclosed in the claims.

The invention claimed is:

1. A Yagi antenna comprising:
   a power transmitting coil which generates an electromagnetic wave;
   a lattice-shaped first slab which is positioned at a rear side of the power transmitting coil and reflects the electromagnetic wave generated at the power transmitting coil; and
   a lattice-shaped second slab which is positioned at a front side of the power transmitting coil, focuses the electromagnetic wave generated at the power transmitting coil and the electromagnetic wave reflected by the first slab, and transmits the electromagnetic waves to the public.

2. The Yagi antenna of claim 1, wherein each of the first slab and the second slab is made of a metamaterial having a CHDR structure.

3. The Yagi antenna of claim 2, wherein the CHDR structure of the first slab is configured such that cubes, which each have a width of 4 mm, a height of 4 mm, and a depth 4 mm, are arranged at an interval of 2 mm in the square slab having a width of 30 mm, a height of 30 mm, and a thickness of 6 mm.

4. The Yagi antenna of claim 2, wherein the CHDR structure of the second slab is configured such that cubes, which each have a width of 2 mm, a height of 2 mm, and a depth 2 mm, are arranged at an interval of 1 mm in the square slab having a width of 30 mm, a height of 30 mm, and a thickness of 3 mm.

5. A wireless power transmission apparatus comprising:
   a wireless power transmitting device which includes a power transmitting coil;
   a lattice-shaped slab which reflects or focuses an electromagnetic wave generated at the power transmitting coil; and
   a wireless power receiving device which includes a power receiving coil that receives the electromagnetic wave.

6. The wireless power transmission apparatus of claim 5, wherein the slab is made of a metamaterial having a CHDR structure, is positioned at a rear side of the power transmitting coil, and reflects an electromagnetic wave generated at the power transmitting coil to a front side of the power transmitting coil.

7. The wireless power transmission apparatus of claim 6, wherein the CHDR structure is configured such that cubes, which each have a width of 4 mm, a height of 4 mm, and a depth 4 mm, are arranged at an interval of 2 mm in the square slab having a width of 30 mm, a height of 30 mm, and a thickness of 6 mm.

8. The wireless power transmission apparatus of claim 5, wherein the slab is made of a metamaterial having a CHDR structure, is positioned between a front side of the power transmitting coil and the power receiving coil, and focuses an electromagnetic wave generated at the power transmitting coil to a front side of the power receiving coil.

9. The wireless power transmission apparatus of claim 8, wherein the CHDR structure is configured such that cubes, which each have a width of 2 mm, a height of 2 mm, and a depth 2 mm, are arranged at an interval of 1 mm in the square slab having a width of 30 mm, a height of 30 mm, and a thickness of 3 mm.

10. The wireless power transmission apparatus of claim 5, wherein the slab is made of a metamaterial having a CHDR structure, and includes a first slab which is positioned at a rear side of the power transmitting coil and reflects an electromagnetic wave generated at the power transmitting coil to a front side of the power transmitting coil, and a second slab which is positioned between the front side of the power transmitting coil and the power receiving coil and focuses the electromagnetic wave generated at the power transmitting coil to a front side of the power receiving coil.

11. The wireless power transmission apparatus of claim 10, wherein the CHDR structure of the first slab is configured such that cubes, which each have a width of 4 mm, a height of 4 mm, and a depth 4 mm, are arranged at an interval of 2 mm in the square slab having a width of 30 mm, a height of 30 mm, and a thickness of 6 mm.

12. The wireless power transmission apparatus of claim 10, wherein the CHDR structure of the second slab is configured such that cubes, which each have a width of 2 mm, a height of 2 mm, and a depth 2 mm, are arranged at an interval of 1 mm in the square slab having a width of 30 mm, a height of 30 mm, and a thickness of 3 mm.

\* \* \* \* \*